US012700614B2

(12) United States Patent
Hong et al.

(10) Patent No.: US 12,700,614 B2
(45) Date of Patent: Aug. 4, 2026

(54) SOLID-STATE ELECTROLYTE FOR SOLID-STATE RECHARGEABLE SODIUM-IONS BATTERIES

(71) Applicant: UMICORE, Brussels (BE)

(72) Inventors: Seung-Tae Hong, Daegu (KR); Jeyne Lyoo, Daegu (KR)

(73) Assignee: UMICORE, Brussels (BE)

( * ) Notice: Subject to any disclaimer, the term of this patent is extended or adjusted under 35 U.S.C. 154(b) by 536 days.

(21) Appl. No.: 18/265,633

(22) PCT Filed: Dec. 16, 2021

(86) PCT No.: PCT/EP2021/086212
§ 371 (c)(1),
(2) Date: Jun. 6, 2023

(87) PCT Pub. No.: WO2022/129339
PCT Pub. Date: Jun. 23, 2022

(65) Prior Publication Data
US 2024/0105987 A1 Mar. 28, 2024

(30) Foreign Application Priority Data

Dec. 17, 2020 (EP) ..................................... 20215015

(51) Int. Cl.
*H01M 10/0562* (2010.01)
*H01M 10/054* (2010.01)
(52) U.S. Cl.
CPC ..... *H01M 10/0562* (2013.01); *H01M 10/054* (2013.01); *H01M 2300/008* (2013.01)

(58) Field of Classification Search
CPC ........... H01M 10/054; H01M 10/0562; H01M 2300/0065; H01M 2300/0068
See application file for complete search history.

(56) References Cited

U.S. PATENT DOCUMENTS

| | | | |
|---|---|---|---|
| 9,553,308 B2 | 1/2017 | Ikeda et al. | |
| 2014/0363745 A1 | 12/2014 | Hirayama et al. | |
| 2015/0280220 A1 | 10/2015 | Ikeda et al. | |
| 2024/0413389 A1* | 12/2024 | Kim ........................ | H01M 4/62 |

FOREIGN PATENT DOCUMENTS

| | | |
|---|---|---|
| CN | 103999272 A | 8/2014 |
| CN | 103999279 A | 8/2014 |
| CN | 108390094 A | 8/2018 |

(Continued)

OTHER PUBLICATIONS

CN108390094 English translation. Xie et al. China. Aug. 10, 2018. (Year: 2018).*

(Continued)

*Primary Examiner* — Christopher P Domone
(74) *Attorney, Agent, or Firm* — Rimon P.C.; Allyn B. Elliott

(57) ABSTRACT

The present invention provides a solid-state electrolyte for solid-state rechargeable sodium-ions batteries comprising: —Na in a molar content x of at least 3.50 and of at most 4.00, —Sn in a molar content y of at least 0.50 and of at most 1.00, —As in a molar content z superior to 0.00, preferably of at least 0.10, and of at most 0.50, —S in a molar content of 4.00.

12 Claims, 2 Drawing Sheets z = 0.30
z = 0.25
z = 0.20
z = 0.10
z = 0.00

10  20  30  40  50  60  70  80

(°)

(56)          References Cited

FOREIGN PATENT DOCUMENTS

| CN | 109888376 A | 6/2019 |
| KR | 20140092365 A | 7/2014 |
| KR | 20190051519 A | 5/2019 |

OTHER PUBLICATIONS

KIPO: Office Action in Korean Patent Application No. 10-2023-7023647, mailed May 9, 2025, 7 pages.
ISA/EP; International Search Report and Written Opinion for International Patent Application No. PCT/EP2021/086212 dated Apr. 8, 2022, 11 pages.
Sahu, Gayatri, et al., "Air-stable, high-conduction solid electrolytes of arsenic-substituted Li4SnS4", Energy & Environmental Science, 2014, pp. 1053-1058, vol. 7.
JPO: Notice of Reasons for Rejection for corresponding Japanese Patent Application No. 2023-537386, dated Aug. 5, 2024, 3 pages.
CNIPA: Notification of First Office Action and Search Report issued in corresponding Chinese Patent Application No. 202180084727.0, mailed Mar. 26, 2026, with English Translation, 16 pages.

* cited by examiner

SOLID-STATE ELECTROLYTE FOR SOLID-STATE RECHARGEABLE SODIUM-IONS BATTERIES

CROSS-REFERENCE TO RELATED APPLICATIONS

This application is a U.S. National Stage application of International Patent Application No. PCT/EP2021/086212, filed on Dec. 16, 2021, which claims the benefit of European Patent Application No. 20215015.7, filed on Dec. 17, 2020.

TECHNICAL FIELD

The present invention relates to a solid-state electrolyte for solid-state rechargeable sodium-ions batteries. More specifically, the invention relates to a solid-state electrolyte comprising Na, Sn and S.

BACKGROUND

Such a solid-state electrolyte is known from Heo et al. who reported in Adv. Energy Mater. 8, 1702716 (2018) a sodium-ions solid-state electrolyte having a general formula of $Na_{4-x}Sn_{1-x}Sb_xS_4$, wherein $0.02 \leq x \leq 0.33$ which has a Na ion conductivity of maximum 0.30 mS/cm at 30° C. and 0.90 mS/cm at 60° C.

It is an object of the present invention to provide a solid-state electrolyte for solid-state rechargeable sodium-ions batteries providing an improved ionic conductivity of at least 0.10 mS/cm obtained by the analytical methods of the present invention.

It is a further object of the present invention to provide a process for manufacturing said solid-state electrolyte.

It is a further object of the present invention to provide a solid-state rechargeable sodium-ion battery comprising said solid-state electrolyte.

SUMMARY OF THE INVENTION

This objective is achieved by providing a solid-state electrolyte for solid-state rechargeable sodium-ions batteries comprising:

Na in a molar content x of at least 3.50 and of at most 4.00,

Sn in a molar content y of at least 0.50 and of at most 1.00,

As in a molar content z of more than 0.20 and less than 0.30,

S in a molar content of 4.00.

It is indeed observed that a high ionic conductivity (e.g. of at least 0.10 mS/cm) of a solid-state electrolyte is achieved according to the present invention, as illustrated by Example 1, 2, 3, and 4 supported by the results provided in Table 1 and Table 2.

Further, the present invention provides a process of manufacturing a solid-state electrolyte according to the invention. This process according to the invention is illustrated in a non-limitative way in Example 1. The present invention also provides a positive electrode comprising a solid-state electrolyte according to the invention; and a solid-state rechargeable sodium-ions battery comprising a solid-state electrolyte according to the invention.

DESCRIPTION OF THE FIGURES

By means of further guidance, figures are included to better appreciate the teaching of the present invention. Said figures are intended to assist the description of the invention and are nowhere intended as a limitation of the presently disclosed invention. The figures and symbols contained therein have the meaning as commonly understood by one of ordinary skill in the art to which this invention belongs.

DETAILED DESCRIPTION OF THE INVENTION

Figure 1:
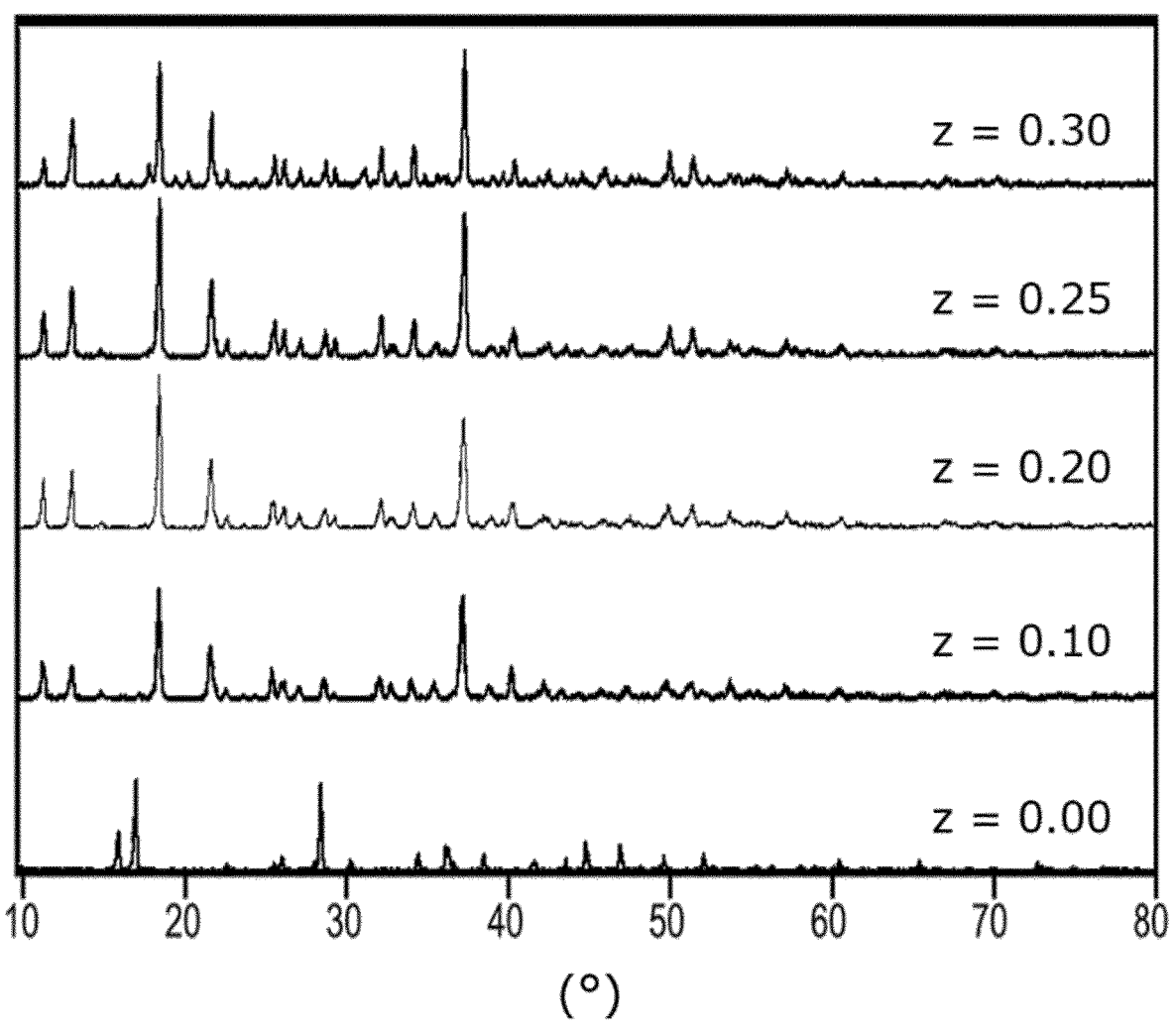
FIG. 1 shows the X-ray diffraction (XRD) patterns of Examples 1 to 4 and Comparative Example 1.

In a first aspect, the present invention provides a solid-state electrolyte for solid-state rechargeable sodium-ions batteries comprising:

Na in a molar content x of at least 3.50 and of at most 4.00,

Sn in a molar content y of at least 0.50 and of at most 1.00,

As in a molar content z superior to 0.00, preferably of at least 0.10, and of at most 0.50, S in a molar content of 4.00.

In a preferred embodiment the solid-state electrolyte comprises a compound comprising Na in a molar content x of at least 3.50 and of at most 4.00, Sn in a molar content y of at least 0.50 and of at most 1.00, As in a molar content z superior to 0.00, preferably of at least 0.10, and of at most 0.50, S in a molar content of 4.00.

In a preferred embodiment, the solid-state electrolyte according to the first aspect has a general formula $Na_xSn_yAs_zS_4$, wherein $3.50 \leq x \leq 4.00$, $0.50 \leq y < 1.00$, and $0.00 < z \leq 0.50$, preferably $0.10 \leq z \leq 0.50$.

Preferably, the molar content x is inferior or equal to 3.90 and preferably x is superior or equal to 3.70.

In a highly preferred embodiment, the solid-state electrolyte is according to the first aspect, wherein $3.55 \leq x \leq 3.95$, preferably $3.60 \leq x \leq 3.90$, more preferably $3.65 \leq x \leq 3.85$. In a more highly preferred embodiment the solid-state electrolyte is according to the first aspect, wherein $3.70 \leq x \leq 3.80$, preferably $3.71 \leq x \leq 3.79$, more preferably $3.72 \leq x \leq 3.78$, even more preferably $3.73 \leq x \leq 3.77$, most preferably $3.74 \leq x \leq 3.76$. In an even more highly preferred embodiment the solid-state electrolyte is according to the first aspect, wherein $3.70 \leq x \leq 3.80$, more preferably $3.72 \leq x \leq 3.78$, most preferably $3.74 \leq x \leq 3.76$. In a highest preferred embodiment the solid-state electrolyte is according to the first aspect, wherein $x = 3.75$.

Preferably, the molar content y is inferior or equal to 0.90 and preferably y is superior or equal to 0.70.

In a highly preferred embodiment, the solid-state electrolyte is according to the first aspect, wherein $0.55 \leq y \leq 0.95$, preferably $0.60 \leq y \leq 0.90$, more preferably $0.65 \leq y \leq 0.85$. In an more highly preferred embodiment the solid-state electrolyte is according to the first aspect, wherein $0.70 \leq y \leq 0.80$, preferably $0.71 \leq y \leq 0.79$, more preferably $0.72 \leq y \leq 0.78$, even more preferably $0.73 \leq y \leq 0.77$, most preferably $0.74 \leq y \leq 0.76$. In an even more highly preferred embodiment the solid-state electrolyte is according to the first aspect, wherein $0.70 \leq y \leq 0.80$, more preferably $0.72 \leq y \leq 0.78$, most preferably $0.74 \leq y \leq 0.76$. In a highest preferred embodiment the solid-state electrolyte is according to the first aspect, wherein $y = 0.75$.

Preferably, the molar content z is inferior or equal to 0.30.

In a highly preferred embodiment, the solid-state electrolyte is according to the first aspect, wherein As is in a molar content z of more than 0.20 and less than 0.30.

In a more highly preferred embodiment, the solid-state electrolyte is according to the first aspect, wherein $0.21 \leq z \leq 0.30$, preferably $0.21 \leq z \leq 0.29$, more preferably $0.22 \leq z \leq 0.29$, even more preferably $0.22 \leq z \leq 0.28$, even more preferably $0.23 \leq z \leq 0.28$, even more preferably $0.24 \leq z \leq 0.28$, even more preferably $0.24 \leq z \leq 0.27$, most preferably $0.24 \leq z \leq 0.26$. In an even more highly preferred embodiment the solid-state electrolyte is according to the first aspect, wherein $0.21 \leq z \leq 0.29$, preferably $0.23 \leq z \leq 0.27$, most preferably $0.24 \leq z \leq 0.26$. In a highest preferred embodiment the solid-state electrolyte is according to the first aspect, wherein $z=0.25$.

In a highly preferred embodiment the solid-state electrolyte is according to the first aspect, wherein $3.70 \leq x \leq 3.80$, preferably $3.72 \leq x \leq 3.78$, more preferably $3.74 \leq x \leq 3.76$;

$0.70 \leq y \leq 0.80$, preferably $0.72 \leq x \leq 0.78$, more preferably $0.74 \leq y \leq 0.76$; and $0.21 \leq z \leq 0.29$, preferably $0.23 \leq x \leq 0.27$, more preferably $0.24 \leq z \leq 0.26$.

In a highest preferred embodiment the solid-state electrolyte is according to the first aspect, wherein $x=3.75$, $y=0.75$ and $z=0.25$.

In a preferred embodiment, the solid-state electrolyte according to the first aspect has a sodium ionic conductivity of superior to 0.30 mS/cm at a temperature of 30° C. and at least 1.00 mS/cm at a temperature of 60° C.

In a preferred embodiment, the solid-state electrolyte according to the first aspect comprises a space group of I41/acd having 13.0 Å≤lattice constant a≤15.0 Å, 25.0 Å≤lattice constant c≤30.0 Å, as determined by XRD.

In a second aspect, the present invention provides a process for manufacturing the solid-state electrolyte according to the first aspect. The process comprises:

a first step of mixing $Na_2S$, $SnS_2$, $As_2S_3$, and S powder in an inert atmosphere so as to obtain a mixture, a second step of pressing said mixture under a pressure between 50-400 MPa, and a third step of firing said pellet at a temperature between 300° C. and 700° C. during a period of time comprised between 1 and 20 hours.

In a preferred embodiment the pressing of said mixture occurs under a pressure between 70-300 MPa, preferably a pressure between 80-200 MPa, more preferably between 100-150 MPa. Alternatively, and in an equally preferred embodiment, the pressing of said mixture occurs in mold having a diameter of 0.5-2 cm, preferably 0.75-1.25 cm, and under a weight between 0.1 and 5 tons, preferably 0.5 and 1.5 tons.

In a third aspect, the present invention provides a positive electrode for solid-state rechargeable sodium-ions batteries, comprising a solid-state electrolyte according to any of the preceding claims.

In a fourth aspect, the present invention provides a solid-state rechargeable sodium-ions battery comprising a solid-state electrolyte according to the first aspect of the invention.

EXAMPLES

1. Description of Analysis Method

1.1. Powder X-Ray Diffraction

The powder X-ray diffraction (XRD) data are collected at 25° C. with an X-ray diffractometer (Rigaku Miniflex 600) using a Cu X-ray tube ($\lambda$=1.5418 Å), a secondary graphite (002) monochromator, and an angular range of $10° \leq 2\theta \leq 80°$. The crystal structure is refined using the powder profile refinement program, *Generalized Structure and Analysis Software* (*GSAS*, B. G. Toby, *J. Appl. Cryst.* 2001, 34(2), 210-213).

1.2. Electrochemical Impedance Spectroscopy (EIS)

The sodium ion conductivity is measured by the AC impedance method using an ion-blocking symmetric cell of Ti/Solid-state electrolyte/Ti in a polyether ether ketone (PEEK) mold (diameter=10 mm), wherein the Ti rod is used as a current collector. The cold pressed pellets were prepared at 3 ton pressure. Frequency is applied from 1 MHz to 100 mHz using EC-Lab software on a Biologic SP-200 single-channel potentiostat. Measurement is conducted at various temperature (30, 45, 60, 75, and 90° C.). The sodium ionic conductivity ($\sigma$) is calculated by below equation;

$$\sigma(S/cm) = \frac{L}{R \times A},$$

where L is the thickness of the pellet (cm), A is the area of the pellet (cm$^2$), and R is the resistance obtained by the electrochemical impedance spectroscopy (S$^{-1}$).

2. Examples and Comparative Examples

Example 1

A $Na_{3.90}Sn_{0.90}As_{0.10}S_4$ powder is prepared by mixing, pelletizing, and subsequent heat treatment according to the following process:

Step 1) Mixing: $Na_2S$, $SnS_2$, $As_2S_3$, and S powder are mixed according to the molar ratio of Na:Sn:As:S=3.90: 0.90:0.10:4.00 using a mortar with a pestle. Since the starting and resultant materials are hygroscopic and air-sensitive, all reactants and products are handled in a dry Argon-filled glove box.

Step 2) Pelletizing: the mixed powder is pelletized in a mold having a diameter of 1 cm by applying 1.0 ton weight. Then, the pelletized sample is placed in a carbon-coated fused-silica ampoule and vacuum-sealed.

Step 3) Heat treatment: the reactants were heated to 400° C. at a rate of 2° C./min in a box furnace, held at this temperature for 12 hours, and cooled to room temperature naturally. After the reaction was completed, the ampoule is opened inside the Argon-filled glove box. The prepared powder is labelled as EX1.

Example 2, Example 3, and Example 4

Samples of Example 2, 3, and 4 are prepared according to the same procedure as EX1 except that different amount of $Na_2S$, $SnS_2$, $As_2S_3$, and S powder are used during step 1 according to the molar ratio illustrated in Table 1. The prepared powders are labelled as EX2, EX3, and EX4, respectively.

Comparative Example 1

A $Na_4SnS_4$ powder is prepared according to the same procedure as EX1 except that no $As_2S_3$ is used in step 1. The prepared powder is labelled as CEX1.

TABLE 1

Summary of the information of the samples according to Examples 1 to 4 and Comparative Example 1

| | $Na_xSn_yAs_zS_4$ | | | |
| Sample ID | x | y | z | $\sigma$ (mS/cm) |
| --- | --- | --- | --- | --- |
| EX1 | 3.90 | 0.90 | 0.10 | 0.21 |
| EX2 | 3.80 | 0.80 | 0.20 | 0.24 |
| EX3 | 3.75 | 0.75 | 0.25 | 0.52 |
| EX4 | 3.70 | 0.70 | 0.30 | 0.17 |
| CEX1 | 4.00 | 1.00 | 0.00 | $<10^{-5}$ |
| Heo et al* | $Na_{3.75}Sn_{0.75}Sb_{0.25}S_4$ | | | 0.30 |

*Adv. Energy Mater. 8, 1702716 (2018)

TABLE 2

Summary of the ionic conductivity of $Na_{3.75}Sn_{0.75}As_{0.25}S_4$ as a function of the temperature

| T (° C.) | $\sigma$ (mS/cm) of EX3 | $\sigma$ (mS/cm) of $Na_{3.75}Sn_{0.75}Sb_{0.25}S_4$ |
| --- | --- | --- |
| 30 | 0.52 | 0.30 |
| 45 | 0.62 | — |
| 60 | 1.03 | 0.90 |
| 75 | 1.68 | — |
| 90 | 1.97 | — |

Figure 2:
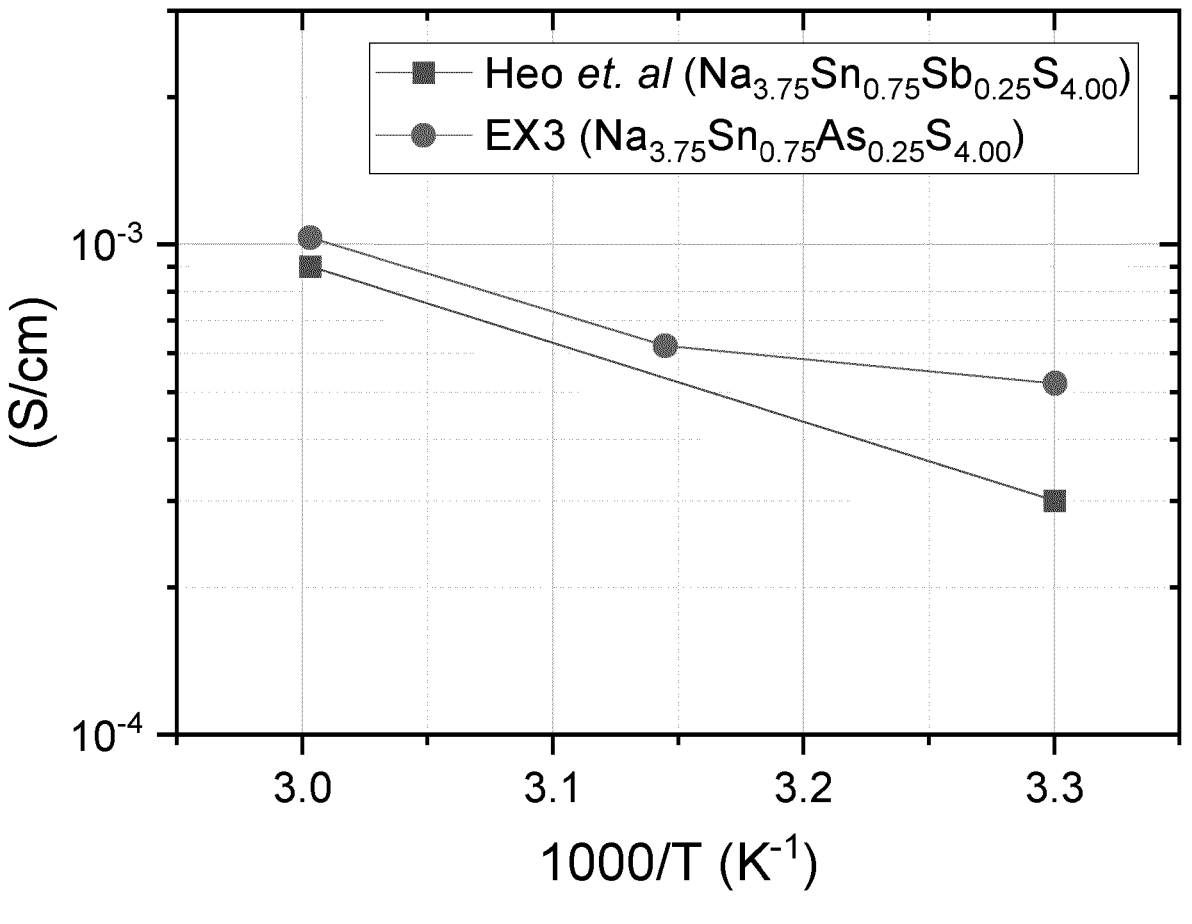
FIG. 2 shows Arrhenius plots of conductivities of EX3 and $Na_{3.75}Sn_{0.75}Sb_{0.25}S_{4.00}$ according to Heo et al. x axis indicates $1000/T$ $(K^{-1})$ whereby T is a temperature (K) and y axis indicates an ionic conductivity.

Table 1 summarizes the molar ratio of the Na, Sn, and As elements and the sodium ionic conductivity ($\sigma$, mS/cm) at 30° C. of the solid-state electrolytes manufactured from Example 1, 2, 3, 4 and Comparative Example 1. According to Table 1, it is observed that the solid-state electrolyte having a general formula $Na_xSn_yAs_zS_4$, wherein $3.50 \leq x \leq 4.00$, $0.50 \leq y < 1.00$, and $0.00 < z \leq 0.50$, preferably $0.10 \leq z \leq 0.50$, has a significantly higher ionic conductivity than the solid-state electrolyte having a formula $Na_4SnS_4$. Furthermore, Table 2 and FIG. 2 summarizes the ionic conductivity of $Na_{3.75}Sn_{0.75}As_{0.25}S_4$ and $Na_{3.75}Sn_{0.75}Sb_{0.25}S_4$ according to Heo et al. at various temperatures by the aforementioned EIS method. According to Table 2, the ionic conductivity at over 60° C. shows over 1.00 mS/cm and this is enough to be conducted in a solid-state rechargeable sodium-ions battery. This observation indicates that the use of $Na_{3.75}Sn_{0.75}As_{0.25}S_4$ as a solid-state electrolyte according to the present invention provides a higher ionic conductivity than the use of $Na_4SnS_4$ which is used as an ion insulator due to a low ionic conductivity. As shown in FIG. 2, the ionic conductivity of solid-state electrolytes increases as an operating temperature increases. EX3 has generally a higher ionic conductivity than $Na_{3.75}Sn_{0.75}Sb_{0.25}S_4$ at any temperature. Therefore, when EX3 is used in a solid-state rechargeable sodium-ions battery, a required ionic conductivity is achievable at a relatively lower operation temperature, which is a benefit for designing a battery management system.

About the structures of the compounds from Examples 1 to 4, FIG. 1 shows that the series of $Na_xSn_yAs_zS_4$ are manufactured properly. As the XRD data of $Na_{3.70}Sn_{0.70}As_{0.30}S_4$ from FIG. 1 suggest, a solid-state electrolyte $Na_{3.70}Sn_{0.70}As_{0.30}S_4$ has some impurities so that a solid-state electrolyte $Na_xSn_yAs_zS_4$ having z lower than 0.30 is more preferred. The $Na_{3.75}Sn_{0.75}As_{0.25}S_4$ has a structure of a space group of I41/acd that a lattice constant a is 13.7074 Å, c is 27.3628 Å, and $\alpha$, $\beta$, and $\gamma$ is 90°.

The invention claimed is:

1. A solid-state electrolyte for solid-state rechargeable sodium-ions batteries comprising:

Na in a molar content x of at least 3.50 and of at most 4.00,

Sn in a molar content y of at least 0.50 and of at most 1.00,

As in a molar content z of $0.21 \leq z \leq 0.29$, and

S in a molar content of 4.00.

2. The solid-state electrolyte for solid-state rechargeable sodium-ions batteries according to claim 1, having a general formula $Na_xSn_yAs_zS_4$, wherein $3.55 \leq x \leq 3.95$.

3. The solid-state electrolyte for solid-state rechargeable sodium-ions batteries according to claim 2, wherein $3.70 \leq x \leq 3.80$.

4. The solid-state electrolyte for solid-state rechargeable sodium-ions batteries according to claim 1, wherein $0.55 \leq y \leq 0.95$.

5. The solid-state electrolyte for solid-state rechargeable sodium-ions batteries according to claim 4, wherein $0.70 \leq y \leq 0.80$.

6. The solid-state electrolyte for solid-state rechargeable sodium-ions batteries according to claim 1, wherein $0.24 \leq z \leq 0.26$.

7. The solid-state electrolyte for solid-state rechargeable sodium-ions batteries according to claim 1, wherein $3.70 \leq x \leq 3.80$, $0.70 \leq y \leq 0.80$ and $0.21 \leq z \leq 0.29$.

8. The solid-state electrolyte for solid-state rechargeable sodium-ions batteries according to claim 1, having a sodium ionic conductivity of superior to 0.30 mS/cm at a temperature of 30° C. and at least 1.00 mS/cm at a temperature of 60° C.

9. The solid-state electrolyte for solid-state rechargeable sodium-ions batteries according to claim 1, comprising a space group of I41/acd having 13.0 Å$\leq$lattice constant a$\leq$15.0 Å, 25.0 Å$\leq$lattice constant c$\leq$30.0 Å, as determined by XRD.

10. A process for manufacturing the solid-state electrolyte according to any of the preceding claims, said process comprising:

a first step of mixing $Na_2S$, $SnS_2$, $As_2S_3$, and S powder in an inert atmosphere so as to obtain a mixture;

a second step of pressing said mixture under a pressure between 50 and 400 MPa, so as to obtain a pellet; and a third step of firing said pellet at a temperature between 300° C. and 700° C. during a period of time comprised between 1 and 20 hours.

11. A positive electrode for solid-state rechargeable sodium-ions batteries, comprising the solid-state electrolyte according to claim 1.

12. A solid-state rechargeable sodium-ions battery comprising the solid-state electrolyte according to claim 1.

* * * * *